United States Patent
Lee et al.

(10) Patent No.: US 12,459,138 B2
(45) Date of Patent: Nov. 4, 2025

(54) GRIPPER

(71) Applicants: Hyundai Motor Company, Seoul (KR); Kia Corporation, Seoul (KR)

(72) Inventors: Seok Woo Lee, Seoul (KR); Byung Ho Yoon, Seoul (KR); Gi Tae Kang, Suwon-si (KR); Hwa Woong Yoo, Gunpo-si (KR); Seok Won Lee, Nonsan-si (KR); Seung Jun Woo, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 811 days.

(21) Appl. No.: 17/831,111

(22) Filed: Jun. 2, 2022

(65) Prior Publication Data
US 2023/0182324 A1    Jun. 15, 2023

(30) Foreign Application Priority Data
Dec. 14, 2021    (KR) .................. 10-2021-0179076

(51) Int. Cl.
*B25J 15/10* (2006.01)
*B25J 9/10* (2006.01)

(52) U.S. Cl.
CPC .............. *B25J 15/10* (2013.01); *B25J 9/102* (2013.01)

(58) Field of Classification Search
CPC ...... B25J 15/10; B25J 15/0213; B25J 15/022; B25J 15/0009; B25J 15/0061; B25J 15/103; B25J 9/08; B25J 9/102
See application file for complete search history.

(56) References Cited

U.S. PATENT DOCUMENTS

| | | | |
|---|---|---|---|
| 5,108,140 A * | 4/1992 | Bartholet | B25J 15/0009 294/115 |
| 5,762,390 A | 6/1998 | Gosselin et al. | |
| 8,424,942 B2 * | 4/2013 | Park | B25J 15/0266 901/38 |
| 8,801,063 B2 * | 8/2014 | Nammoto | B25J 15/0028 901/46 |
| 10,618,766 B2 | 4/2020 | Fridolfsson et al. | |

(Continued)

FOREIGN PATENT DOCUMENTS

JP    2662239 B2    10/1997
JP    2008238326 A    10/2008
(Continued)

*Primary Examiner* — Sang K Kim
(74) *Attorney, Agent, or Firm* — Slater Matsil, LLP (57) ABSTRACT

A gripper includes a finger module coupled to one side of a palm module, the palm module including a first power unit including a first rotary shaft and configured to rotate the first rotary shaft, a screw member configured to rotate in conjunction with a rotation of the first rotary shaft, a nut member coupled to the screw member, a first member coupled to the nut member and movable in a vertical direction in conjunction with a vertical motion of the nut member, the first member having a groove extending in one direction and having a recessed shape, and a connection member having a first side coupled to the finger module and a second side inserted into the groove, wherein the connection member is movable away from or toward the screw member by restriction between the connection member and an inner surface of the groove.

20 Claims, 10 Drawing Sheets

(56) References Cited

U.S. PATENT DOCUMENTS

| | | |
|---|---|---|
| 10,974,367 B2 | 4/2021 | Tseng et al. |
| 2003/0090115 A1 | 5/2003 | Kim et al. |
| 2020/0353597 A1 | 11/2020 | Tseng et al. |

FOREIGN PATENT DOCUMENTS

| | | |
|---|---|---|
| KR | 20110111872 A | 10/2011 |
| KR | 102269012 B1 | 6/2021 |
| KR | 102280511 B1 | 7/2021 |

\* cited by examiner

GRIPPER

CROSS-REFERENCE TO RELATED APPLICATIONS

This application claims the benefit of Korean Patent Application No. 10-2021-0179076, filed on Dec. 14, 2021, which application is hereby incorporated herein by reference.

TECHNICAL FIELD

The present disclosure relates to a gripper.

BACKGROUND

One of the robots capable of mimicking human motions is a gripper capable of mimicking a motion of a human hand. The gripper is a kind of robot having a structure capable of grasping an object and has a structure in which finger modules and a palm module are coupled. Therefore, the gripper grasps the object when the finger modules are bent in a state in which the palm module supports the object.

However, in the related art, the finger module of the gripper may implement a joint motion to mimic a motion of a human finger, whereas the palm module is kept fixed. Therefore, in the related art, there is a problem in that types and sizes of objects, which can be grasped by the gripper, are limited by the size of the palm module.

SUMMARY

The present disclosure relates to a gripper. Particular embodiments relate to a gripper having a structure capable of grasping an object.

Embodiments of the present disclosure provide a gripper having a structure that may adjust an interval between a palm module and a finger module to enable the gripper to grasp objects of various types and sizes.

An exemplary embodiment of the present disclosure provides a gripper including a palm module and a finger module coupled to one side of the palm module, in which the palm module includes, a first power unit including a first rotary shaft and configured to rotate the first rotary shaft, a screw member configured to rotate in conjunction with a rotation of the first rotary shaft, a nut member coupled to the screw member by bolt-nut coupling, a first member fixedly coupled to the nut member and configured to be movable in a vertical direction in conjunction with a vertical motion of the nut member caused by a rotation of the screw member, the first member having a groove extending in one direction and having a recessed shape, and a connection member having one side coupled to the finger module and the other side inserted into the groove, and in which when the first member moves in the vertical direction, the connection member is moved away from or toward the screw member by restriction between the connection member and an inner surface of the groove.

The first member may include a plate region fixedly coupled to the nut member and having a plate shape extending in a horizontal direction and a slide region fixedly coupled to one side of the plate region and having the groove.

The groove may be in the form of a hole that penetrates the slide region.

The groove may have a shape extending in a direction inclined with respect to the vertical direction and the horizontal direction.

The groove may have a shape extending upward as the shape extends outward in the horizontal direction.

The palm module may further include a second member spaced apart upward from the first member and coupled to an upper region of the screw member so that the upper region of the screw member is rotatable and a third member spaced apart downward from the first member and coupled to a lower region of the screw member so that the lower region of the screw member is rotatable.

The connection member may include a connection body region fixedly coupled to the finger module and a horizontal extension region extending in a horizontal direction from the connection body region and inserted into the groove.

The palm module may include a first-first gear fixedly coupled to the first rotary shaft and a first-second gear configured to engage with the first-first gear and fixedly coupled to the screw member.

The first-first gear may be disposed outward from the first-second gear.

The finger module may be provided in plural, the plurality of finger modules may include a first finger module, a second finger module, and a third finger module that are separately provided, and the second and third finger modules may be rotatable about the palm module.

The first finger module may be provided so as not to rotate about the palm module.

A rotational motion of the second finger module relative to the palm module and a rotational motion of the third finger module relative to the palm module may interact with each other.

A direction of the rotational motion of the second finger module relative to the palm module may be opposite to a direction of the rotational motion of the third finger module relative to the palm module.

The palm module may further include a second power unit including a second rotary shaft and configured to rotate the second rotary shaft, a second-first gear fixedly coupled to the second rotary shaft, a second-second gear configured to engage with the second-first gear, and a second-third gear configured to engage with the second-second gear and rotate the second finger module.

The palm module may further include a second-fourth gear configured to engage with the second-second gear and a second-fifth gear configured to engage with the second-fourth gear and rotate the third finger module.

The second-second gear, the second-third gear, the second-fourth gear, and the second-fifth gear may be disposed in one direction in a horizontal direction.

An outer diameter of the second-second gear, an outer diameter of the second-third gear, an outer diameter of the second-fourth gear, and an outer diameter of the second-fifth gear may be equal to one another.

An outer diameter of the second-first gear may be smaller than the outer diameter of each of the second-second gear, the second-third gear, the second-fourth gear, and the second-fifth gear.

A direction in which the second-second gear, the second-third gear, the second-fourth gear, and the second-fifth gear are disposed in the horizontal direction may be perpendicular to a direction in which the first finger module extends in the horizontal direction from the palm module.

The finger module may include a third power unit including a third rotary shaft and configured to rotate the third rotary shaft, a worm gear fixedly coupled to the third rotary shaft, a first gear configured to engage with the worm gear, and a second gear configured to rotate in conjunction with a rotation of the first gear.

The finger module may include a first link coupled to a rotary shaft provided in the finger module and a second link rotatably coupled to the first link.

The finger module may further include a third link configured to rotate together with the second gear and a fourth link having one side rotatably coupled to the third link and the other side coupled to the second link.

According to embodiments of the present disclosure, it is possible to provide the gripper having the structure that may adjust the interval between the palm module and the finger module to enable the gripper to grasp objects of various types and sizes.

DETAILED DESCRIPTION OF ILLUSTRATIVE EMBODIMENTS

Hereinafter, a gripper according to embodiments of the present disclosure will be described with reference to the drawings.

Gripper

Figure 1:
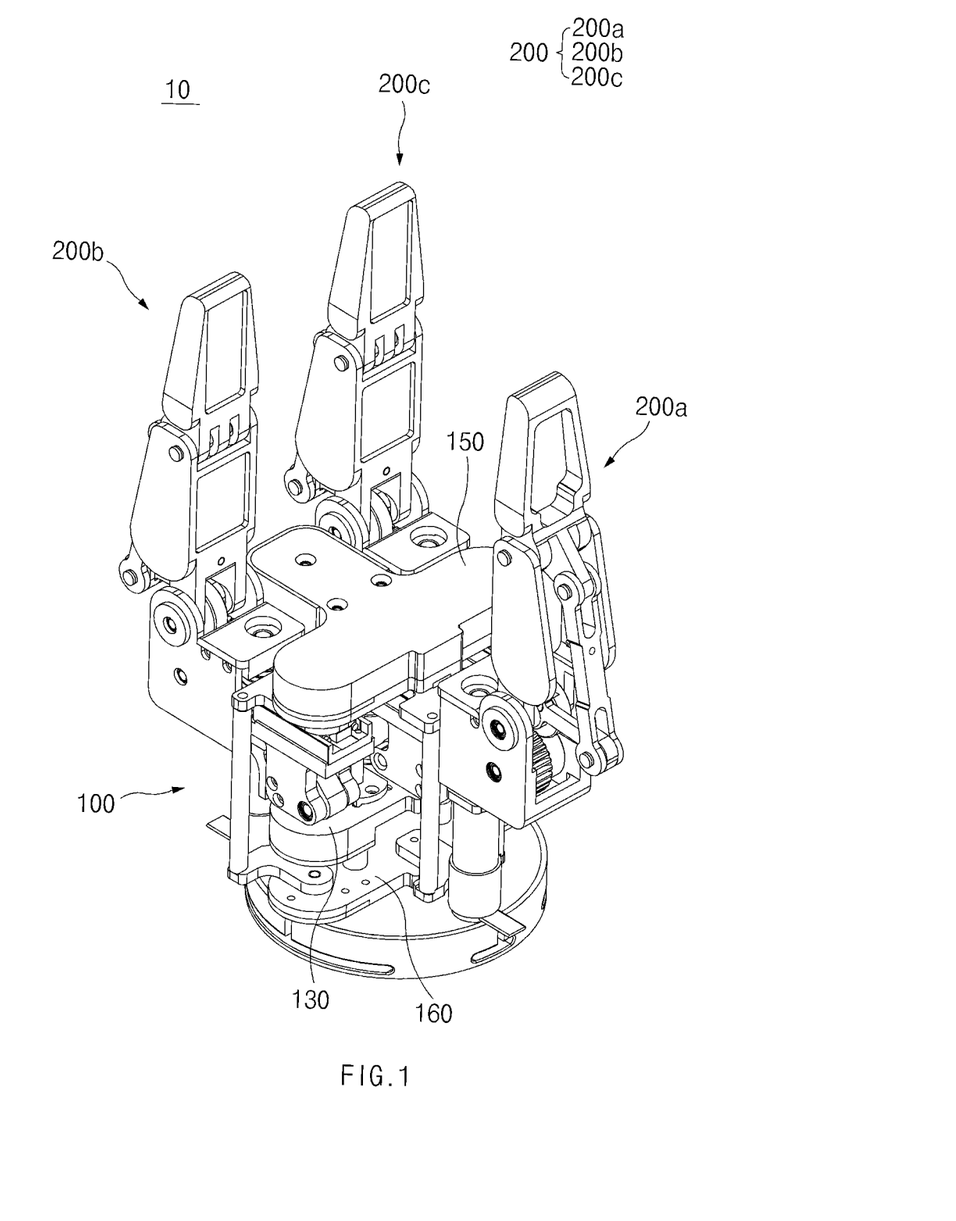
FIG. 1 is a perspective view illustrating a gripper according to embodiments of the present disclosure.
Figure 2:
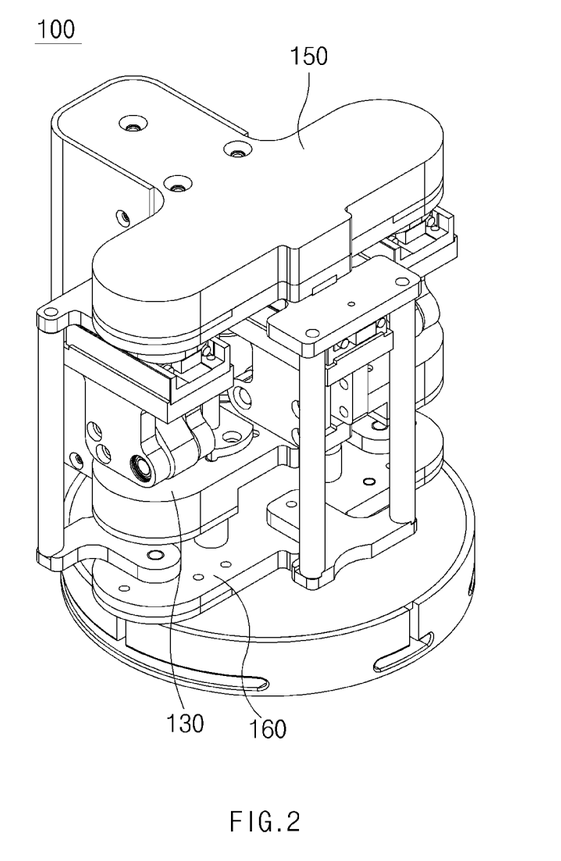
FIG. 2 is a perspective view illustrating a palm module of the gripper according to embodiments of the present disclosure.
Figure 3:
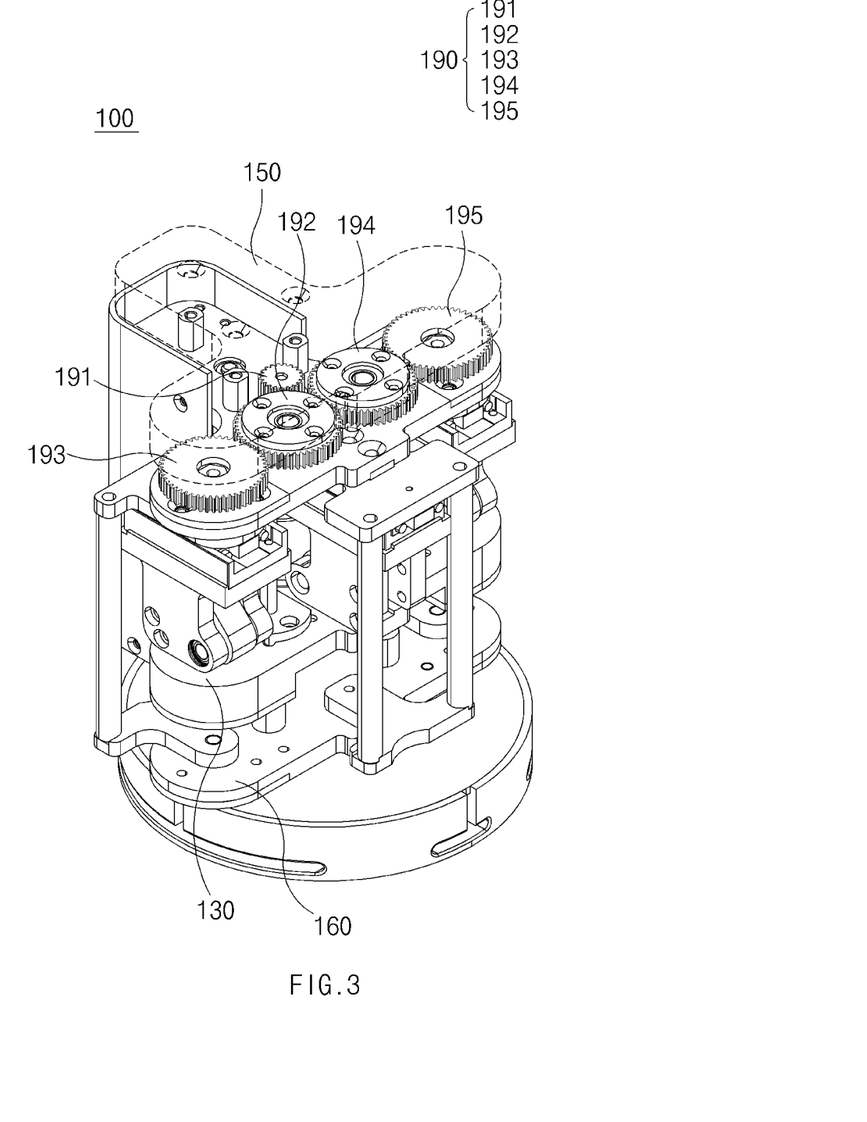
FIG. 3 is a transparent perspective view illustrating an internal structure of the palm module of the gripper according to embodiments of the present disclosure.
Figure 4:
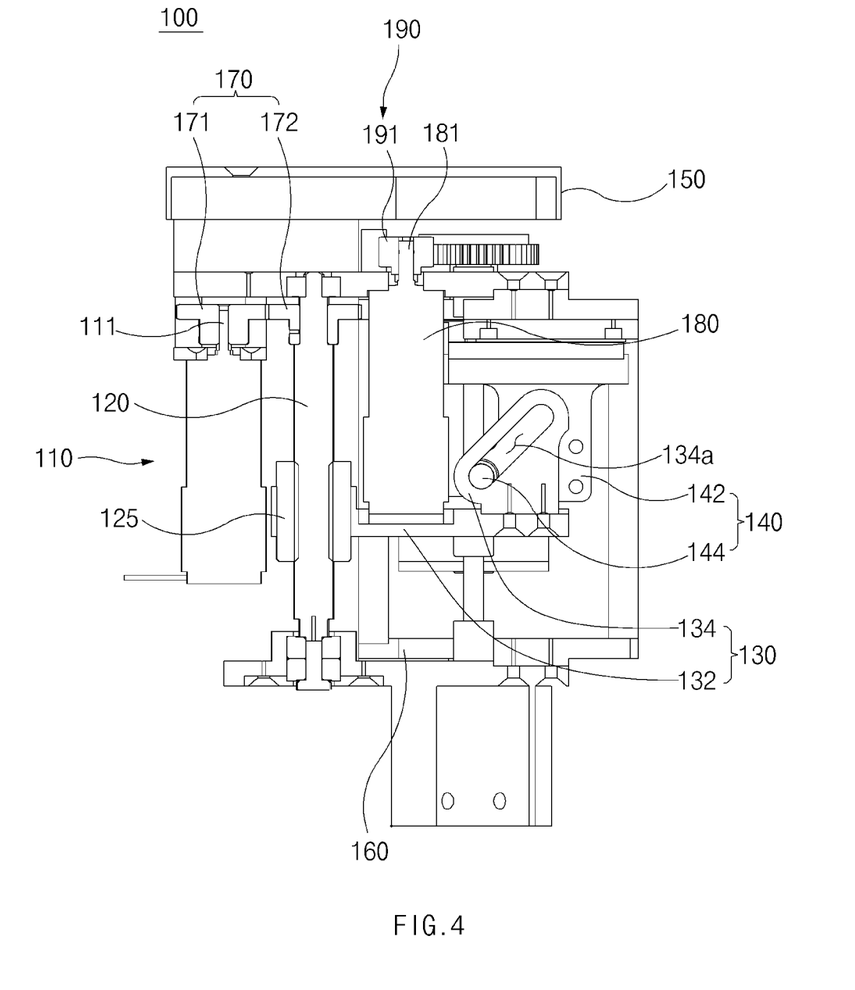
FIG. 4 is a vertical cross-sectional view illustrating the palm module of the gripper according to embodiments of the present disclosure.

FIG. 1 is a perspective view illustrating a gripper according to embodiments of the present disclosure, and FIG. 2 is a perspective view illustrating a palm module of the gripper according to embodiments of the present disclosure. FIG. 3 is a transparent perspective view illustrating an internal structure of the palm module of the gripper according to embodiments of the present disclosure, and FIG. 4 is a vertical cross-sectional view illustrating the palm module of the gripper according to embodiments of the present disclosure.

Referring to FIGS. 1 to 4, a gripper 10 according to embodiments of the present disclosure may include a palm module 100 and finger modules 200 coupled to one side of the palm module 100. The palm module 100 and the finger modules 200 may be configured to correspond to human palm and fingers, respectively. Therefore, the gripper 10 may grasp an object as link structures of the finger modules 200 are bent in a state in which the object is in contact with the palm module 100 of the gripper 10.

In particular, according to embodiments of the present disclosure, the gripper may grasp objects of various types and sizes because a distance between the finger module 200 and the palm module 100 may be adjusted as described below.

In more detail, referring to FIGS. 1 to 4, the palm module 100 of the gripper 10 may include a first power unit 110 including a first rotary shaft 111 and configured to rotate the first rotary shaft 111. For example, the first power unit 110 may be an electric motor, but the type of first power unit 110 is not limited thereto.

The palm module 100 may further include a screw member 120 configured to rotate in conjunction with the rotation of the first rotary shaft 111. As described below, the first rotary shaft 111 and the screw member 120 may be indirectly connected by means of other components in a power connection manner. Alternatively, the screw member 120 may be directly and fixedly coupled to the first rotary shaft 111.

In addition, the palm module 100 may further include a nut member 125 coupled to the screw member 120 by bolt-nut coupling. Therefore, when the screw member 120 rotates by receiving power from the first rotary shaft 111, the nut member 125 may move in a vertical direction relative to the screw member 120. In more detail, the screw member 120 may be configured to rotate but not move in the vertical direction. Therefore, the nut member 125 may move in the vertical direction by means of a restriction relationship made by the bolt-nut coupling.

Referring to FIGS. 1 to 4, the palm module 100 may further include a first member 130 coupled to the nut member 125 and configured to be movable in the vertical direction in conjunction with a vertical motion of the screw member 120.

In this case, according to embodiments of the present disclosure, the first member 130 may have a groove 134a having a shape extending in one direction and recessed from the first member 130. For example, the first member 130 may include a plate region 132 fixedly coupled to the nut member 125 and having a plate shape extending in a horizontal direction perpendicular to the vertical direction, and a slide region 134 fixedly coupled to one side of the plate region 132 and having the groove 134a. As illustrated in FIG. 4, as an example, the groove 134a may be in the form of a hole that penetrates the slide region 134. However, the groove 134a may have a simply recessed shape without penetrating the slide region 134.

In addition, the palm module 100 may further include a connection member 140 having one side coupled to the finger module 200 and the other side inserted into the groove 134a. According to embodiments of the present disclosure, since the other side of the connection member 140 is inserted into the groove 134a, the connection member 140 may be moved away from or toward the screw member 120 by interference between the connection member 140 and an inner surface of the groove 134a as the first member 130 including the slide region 134 moves in the vertical direction. In this case, since one side of the connection member 140 is coupled to the finger module 200 as described above, the distance between the finger module 200 and the palm module 100 may be adjusted as the connection member 140 moves away from or toward the screw member 120. A detailed principle of adjusting the distance between the finger module 200 and the palm module 100 will be described after the description of an overall configuration of the gripper 10 according to embodiments of the present disclosure.

Referring to FIG. 4, the groove 134a may have a shape extending in a direction inclined with respect to the vertical direction and the horizontal direction. For example, as illustrated in FIG. 4, the groove 134a may have a shape extending upward as the shape extends outward in the horizontal direction.

Meanwhile, the palm module 100 may further include a second member 150 spaced apart upward from the first member 130 and coupled to an upper region of the screw member 120 so that the upper region of the screw member 120 is rotatable, and a third member 160 spaced apart downward from the first member 130 and coupled to a lower region of the screw member 120 so that the lower region of the screw member 120 is rotatable. For example, an upper end of the screw member 120 may be inserted into and coupled to the second member 150, and a lower end of the screw member 120 may be inserted into and coupled to the third member 160. The second and third members 150 and 160 may serve to support the screw member 120 and more stably fix the screw member 120. In addition, the second and third members 150 and 160 may also serve to restrict a vertical movement of the screw member 120.

Meanwhile, the connection member 140 may include a connection body region 142 fixedly coupled to the finger module 200, and a horizontal extension region 144 extending in the horizontal direction from the connection body region 142 and inserted into the groove 134a. Therefore, when the first member 130 moves in the vertical direction, the connection member 140 is moved away from or toward the screw member 120 by interference between the horizontal extension region 144 and the inner surface of the groove 134a. More particularly, the connection member 140 may move in the horizontal direction in conjunction with a vertical motion of the first member 130.

Referring to FIGS. 1 to 4, the palm module 100 may include a first gear group 170 including a plurality of gears. In more detail, the palm module 100 may include a first-first gear 171 fixedly coupled to the first rotary shaft 111, and a first-second gear 172 fixedly coupled to the screw member 120 and configured to engage with the first-first gear 171. For example, as illustrated in FIG. 4, the first-first gear 171 may be fixedly coupled to an upper end of the first rotary shaft 111, and the first-second gear 172 may be fixedly coupled to the upper end of the screw member 120. According to embodiments of the present disclosure, the first rotary shaft in and the screw member 120 may be indirectly connected to each other by means of the first gear group 170, and the screw member 120 may also be rotated by the rotation of the first rotary shaft 111. Meanwhile, as illustrated in FIGS. 3 and 4, the first-first gear 171 may be disposed outward in the horizontal direction from the first-second gear 172, and the first rotary shaft 111 of the first power unit 110 may also be disposed outward in the horizontal direction from the screw member 120.

Meanwhile, the finger module 200 of the gripper 10 according to embodiments of the present disclosure may be provided in plural. In more detail, the finger modules 200 may include a first finger module 200a, a second finger module 200b, and a third finger module 200c which are separately provided.

In this case, according to embodiments of the present disclosure, the second and third finger modules 200b and 200c may be rotatable about the palm module 100. In more detail, the second and third finger modules 200b and 200c may be rotatable about the palm module 100 and movable on a plane parallel to the horizontal direction.

In contrast, according to embodiments of the present disclosure, the first finger module 200a may be provided so as not to rotate about the palm module 100. Therefore, according to embodiments of the present disclosure, as the second and third finger modules 200b and 200c rotate about the palm module 100, the distances between the first to third finger modules 200a, 200b, and 200c may be adjusted.

In addition, the rotational motion of the second finger module 200b relative to the palm module 100 and the rotational motion of the third finger module 200c relative to the palm module 100 may interact with each other. This may mean that the second and third finger modules 200b and 200c are indirectly connected by means of the palm module 100, as described above, such that the motions of the two modules are synchronized with each other. More particularly, a direction of the rotational motion of the second finger module 200b relative to the palm module 100 may be opposite to a direction of the rotational motion of the third finger module 200c relative to the palm module 100. Therefore, when the second finger module 200b rotates toward the first finger module 200a, the third finger module 200c may also rotate toward the first finger module 200a. When the second finger module 200b rotates away from the first finger module 200a, the third finger module 200c may also rotate away from the first finger module 200a.

Referring to FIGS. 1 to 4, the palm module 100 may include a second power unit 180 including a second rotary shaft 181 and configured to rotate the second rotary shaft 181, and a second gear group 190 including a plurality of gears and configured to rotate in conjunction with a rotational motion of the second rotary shaft 181.

In more detail, the second gear group 190 provided in the palm module 100 may include a second-first gear 191 fixedly coupled to the second rotary shaft 181, a second-second gear 192 configured to engage with the second-first gear 191, and a second-third gear 193 configured to engage with the second-second gear 192 and rotate the second finger module 200b. For example, the second-third gear 193 may be fixedly coupled to one side of the second finger module 200b. For example, FIGS. 3 and 4 illustrate a state in which the second-first gear 191 is fixedly coupled to an upper end of the second rotary shaft 181. Therefore, according to embodiments of the present disclosure, a rotational force of the second-first gear 191 may be transmitted to the second finger module 200b via the second-second gear 192 and the second-third gear 193.

In addition, the second gear group 190 provided in the palm module 100 may further include a second-fourth gear 194 configured to engage with the second-second gear 192, and a second-fifth gear 195 configured to engage with the second-fourth gear 194 and rotate the third finger module 200c. For example, the second-fifth gear 195 may be fixedly coupled to one side of the third finger module 200c. Therefore, according to embodiments of the present disclosure, a rotational force of the second-first gear 191 may be transmitted to the third finger module 200c via the second-fourth gear 194 and the second-fifth gear 195. Furthermore, according to embodiments of the present disclosure, the rotational motions of the second and third finger modules 200b and 200c may be synchronized by the second gear group 190.

The second-second gear 192, the second-third gear 193, the second-fourth gear 194, and the second-fifth gear 195 may be disposed in one direction in the horizontal direction. More particularly, a central axis of the second-second gear 192, a central axis of the second-third gear 193, a central axis of the second-fourth gear 194, and a central axis of the second-fifth gear 195 may be disposed in parallel in the one direction in the horizontal direction. FIG. 3 illustrates a state in which the second-third gear 193, the second-second gear 192, the second-fourth gear 194, and the second-fifth gear 195 may be sequentially disposed in one direction.

In addition, an outer diameter of the second-second gear 192, an outer diameter of the second-third gear 193, an outer diameter of the second-fourth gear 194, and an outer diameter of the second-fifth gear 195 may be equal to one another. Therefore, according to embodiments of the present disclosure, an angle of the rotational motion of the second finger module 200b and an angle of the rotational motion of the third finger module 200c may be always equal to each other.

In contrast, an outer diameter of the second-first gear 191 may be smaller than the outer diameter of each of the second-second gear 192, the second-third gear 193, the second-fourth gear 194, and the second-fifth gear 195. In addition, for example, FIG. 3 illustrates a state in which the second-first gear 191 is disposed between the second-second gear 192 and the second-fourth gear 194.

In addition, as illustrated in FIG. 3, a direction in which the second-second gear 192, the second-third gear 193, the second-fourth gear 194, and the second-fifth gear 195 are disposed in the horizontal direction may be perpendicular to a direction in which the first finger module 200a extends in the horizontal direction from the palm module 100. Therefore, the second and third finger modules 200b and 200c may be symmetric in the horizontal direction based on the direction toward the palm module 100 from the first finger module 200a.

Figure 5:
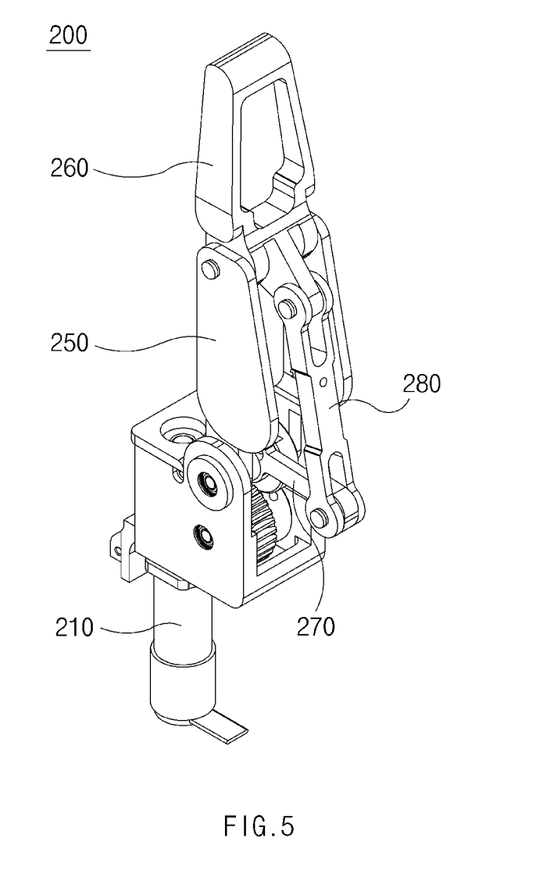
FIG. 5 is a perspective view illustrating a finger module of the gripper according to embodiments of the present disclosure.
Figure 6:
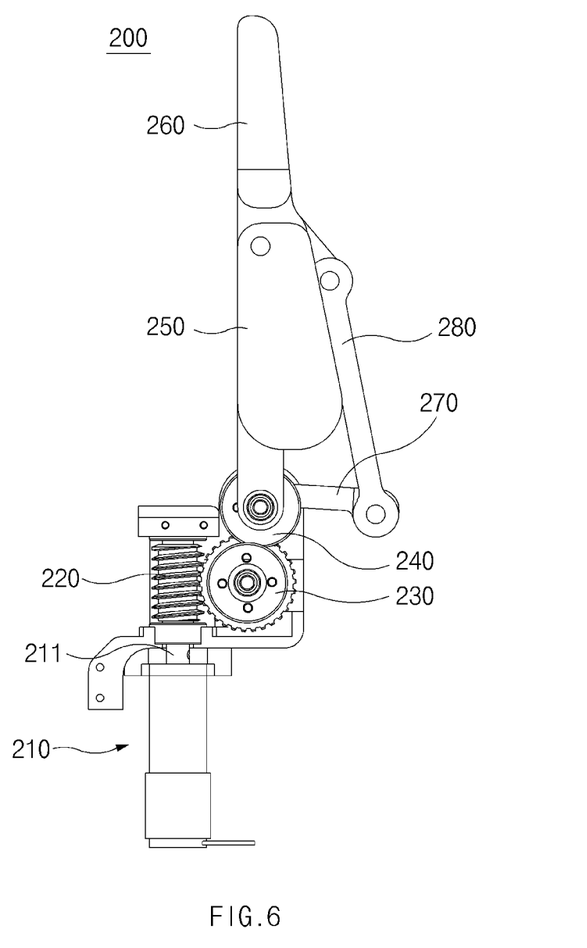
FIG. 6 is a vertical cross-sectional view illustrating the finger module of the gripper according to embodiments of the present disclosure.

FIG. 5 is a perspective view illustrating the finger module of the gripper according to embodiments of the present disclosure, and FIG. 6 is a vertical cross-sectional view illustrating the finger module of the gripper according to embodiments of the present disclosure. The following description of the finger module 200 may be equally applied to all of the first finger module 200a, the second finger module 200b, and the third finger module 200c.

Referring to FIGS. 5 and 6, the finger module 200 may include a third power unit 210 including a third rotary shaft 211 and configured to rotate the third rotary shaft 211, a worm gear 220 fixedly coupled to the third rotary shaft 211, a first gear 230 configured to engage with the worm gear 220, and a second gear 240 configured to rotate in conjunction with a rotation of the first gear 230. Therefore, rotational power may be transmitted to the second gear 240 via the first gear 230 when the worm gear 220 is rotated by the rotation of the third rotary shaft 211. For example, the finger module 200 may additionally have a shaft member (not illustrated) coupled to the first gear 230, and the second gear 240 may be configured to engage with a connection gear (not illustrated) coupled to the shaft member. Therefore, when the first gear 230 rotates, the shaft member and the connection gear may rotate together, and the second gear 240 engaging with the connection gear may also rotate in conjunction with the rotation of the first gear 230. However, a power transmission structure, which allows the second gear 240 to rotate in conjunction with the rotation of the first gear 230, may be implemented in various forms without being limited to the above-mentioned description.

In addition, the finger module 200 may further include a first link 250 coupled to a rotary shaft (not illustrated) provided in the finger module, and a second link 260 rotatably coupled to the first link 250. The first link 250 and the second link 260 may be configured to mimic a joint motion of a finger. Therefore, when the gripper 10 intends to grasp an object, the first link 250 also rotates in conjunction with the rotational motion of the second gear 240. The first link 250 may rotate until the first link 250 presses the object and does not rotate any further because of interference with the object.

However, not only the first link 250, but also the second link 260 needs to press the object and interfere with the object in order to allow the gripper 10 to more assuredly grasp the object. To this end, the second link 260 needs to continuously rotate relative to the first link 250 even after the rotational motion of the first link 250 is stopped. To achieve the above-mentioned object, a configuration in which a separate power source for rotating the second link 260 is mounted may be considered. However, embodiments of the present disclosure may provide the structure in which the second link 260 may rotate by using power of the third power unit 210 even after the rotational motion of the first link 250 is stopped.

Referring to FIGS. 5 and 6, the finger module 200 may further include a third link 270 configured to rotate together with the second gear 240, and a fourth link 280 having one side rotatably coupled to the third link 270 and the other side coupled to the second link 260. For example, as illustrated in FIG. 5, the fourth link 280 may be rotatably coupled to the second link 260. In more detail, the third link 270 may be fixed relative to the second gear 240 so that the third link 270 rotates together with the second gear 240. The fourth link 280 may be disposed outside the second link 260 so that the fourth link 280 may press the second link 260 in the direction toward the palm module 100. For example, the third link 270 may be fixedly coupled to the second gear 240. Therefore, according to embodiments of the present disclosure, the third and fourth links 270 and 280 may continuously rotate even though the rotational motion of the first link 250 is stopped by the interference with the object. The fourth link 280 may press the second link 260 in the direction toward the palm module 100, thereby rotating the second link 260 relative to the first link 250. The second link 260 may rotate until the interference is generated by contact with the object. Meanwhile, predetermined torque is indirectly applied to the first link 250 as the rotational motion of the third link 270 allows the third link 270 to press the second link 260, and the first link 250 may be rotated by the predetermined torque until the first link 250 comes into contact with the object.

A process of operating the gripper 10 according to embodiments of the present disclosure will be described with reference to the above-mentioned description.

Figure 7:
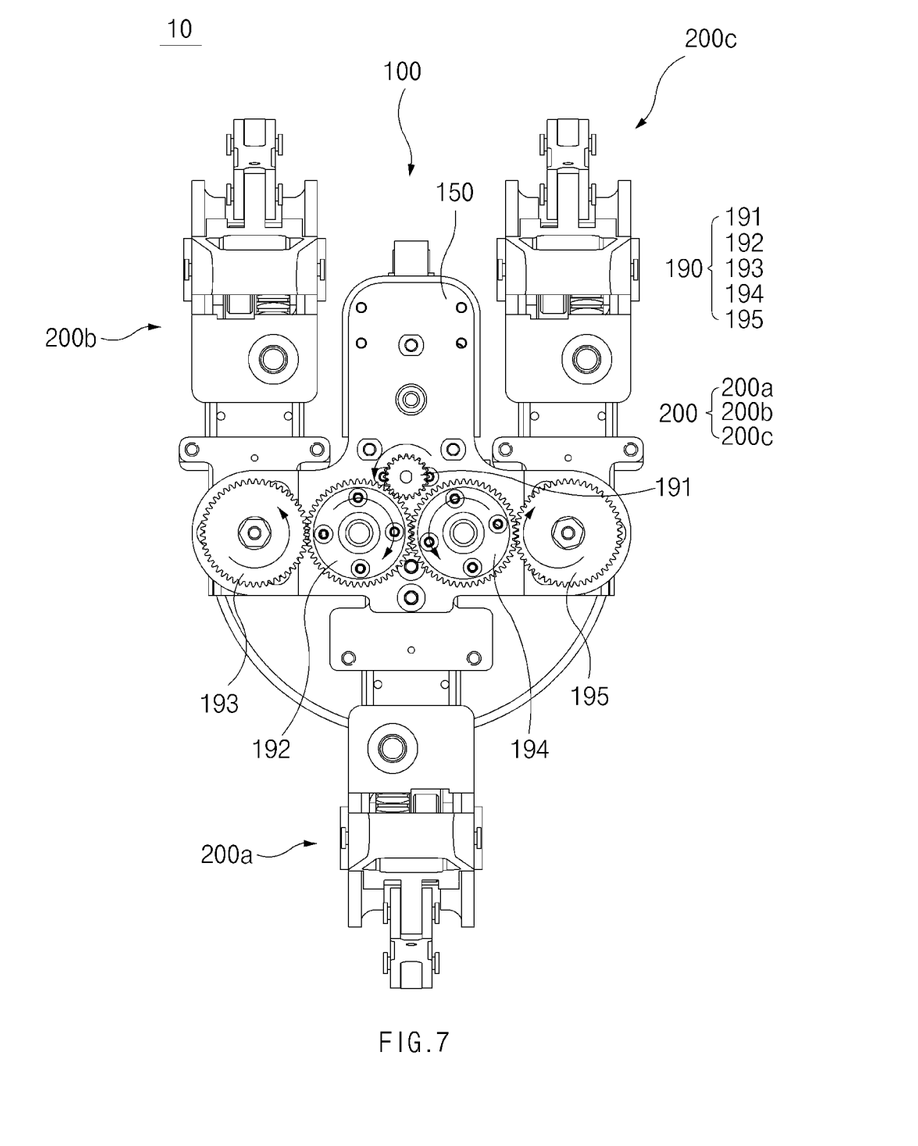
FIG. 7 is a top plan view illustrating a state in which second and third finger modules are rotated to be spaced apart from a first finger module among the finger modules of the gripper according to embodiments of the present disclosure.
Figure 8:
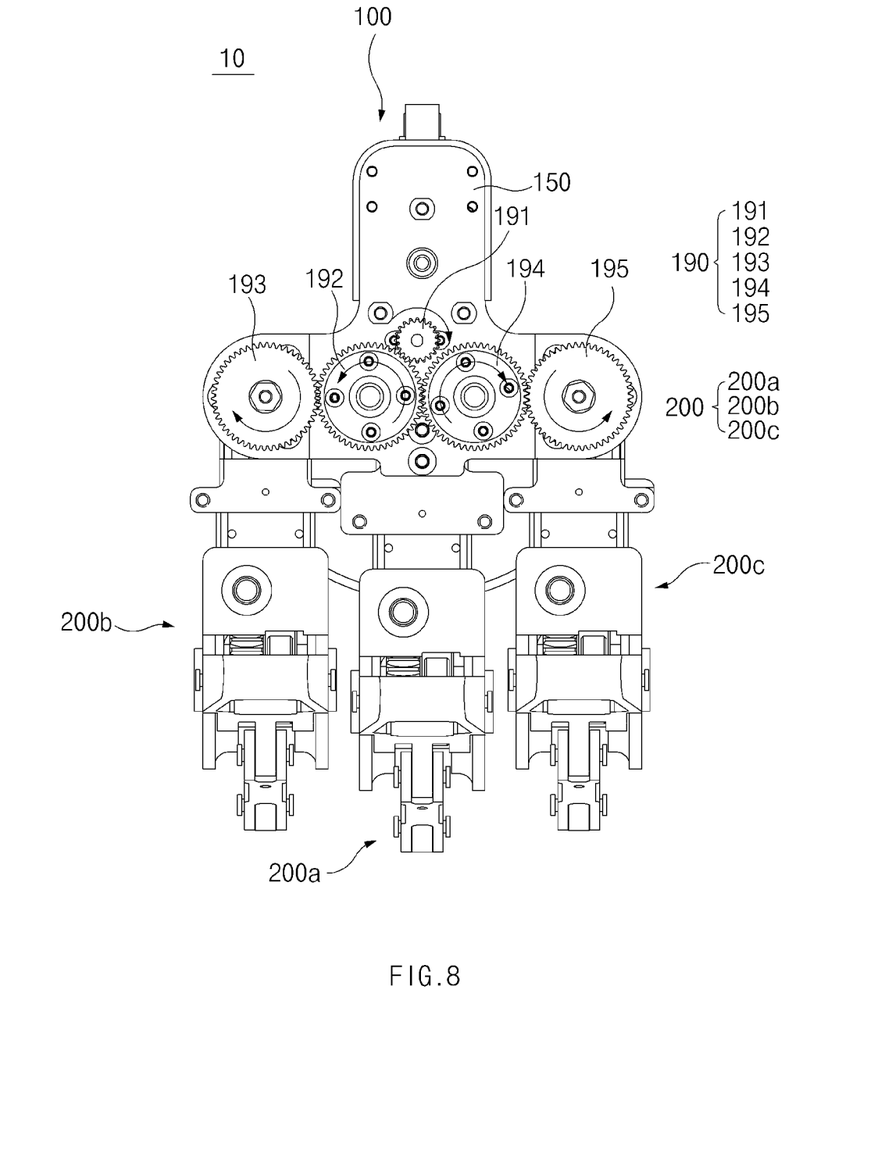
FIG. 8 is a top plan view illustrating a state in which the second and third finger modules are rotated to be adjacent to the first finger module among the finger modules of the gripper according to embodiments of the present disclosure.

FIG. 7 is a top plan view illustrating a state in which the second and third finger modules are rotated to be spaced apart from the first finger module among the finger modules of the gripper according to embodiments of the present disclosure, and FIG. 8 is a top plan view illustrating a state in which the second and third finger modules are rotated to be adjacent to the first finger module among the finger modules of the gripper according to embodiments of the present disclosure.

Referring to FIG. 7, when the second-first gear 191 rotates counterclockwise as the second rotary shaft 181 (see FIG. 4, etc.) of the second power unit 180 (see FIG. 4, etc.) rotates, the second-third gear 193 and the second-fifth gear 195 are rotated clockwise by means of the second-second gear 192 and the second-fourth gear 194. In this case, the second and third finger modules 200b and 200c rotate toward the first finger module 200a.

In contrast, referring to FIG. 8, when the second-first gear 191 rotates clockwise as the second rotary shaft of the second power unit rotates, the second-third gear 193 and the second-fifth gear 195 are rotated counterclockwise by the second-second gear 192 and the second-fourth gear 194. In this case, the second and third finger modules 200b and 200c rotate away from the first finger module 200a.

Figure 9:
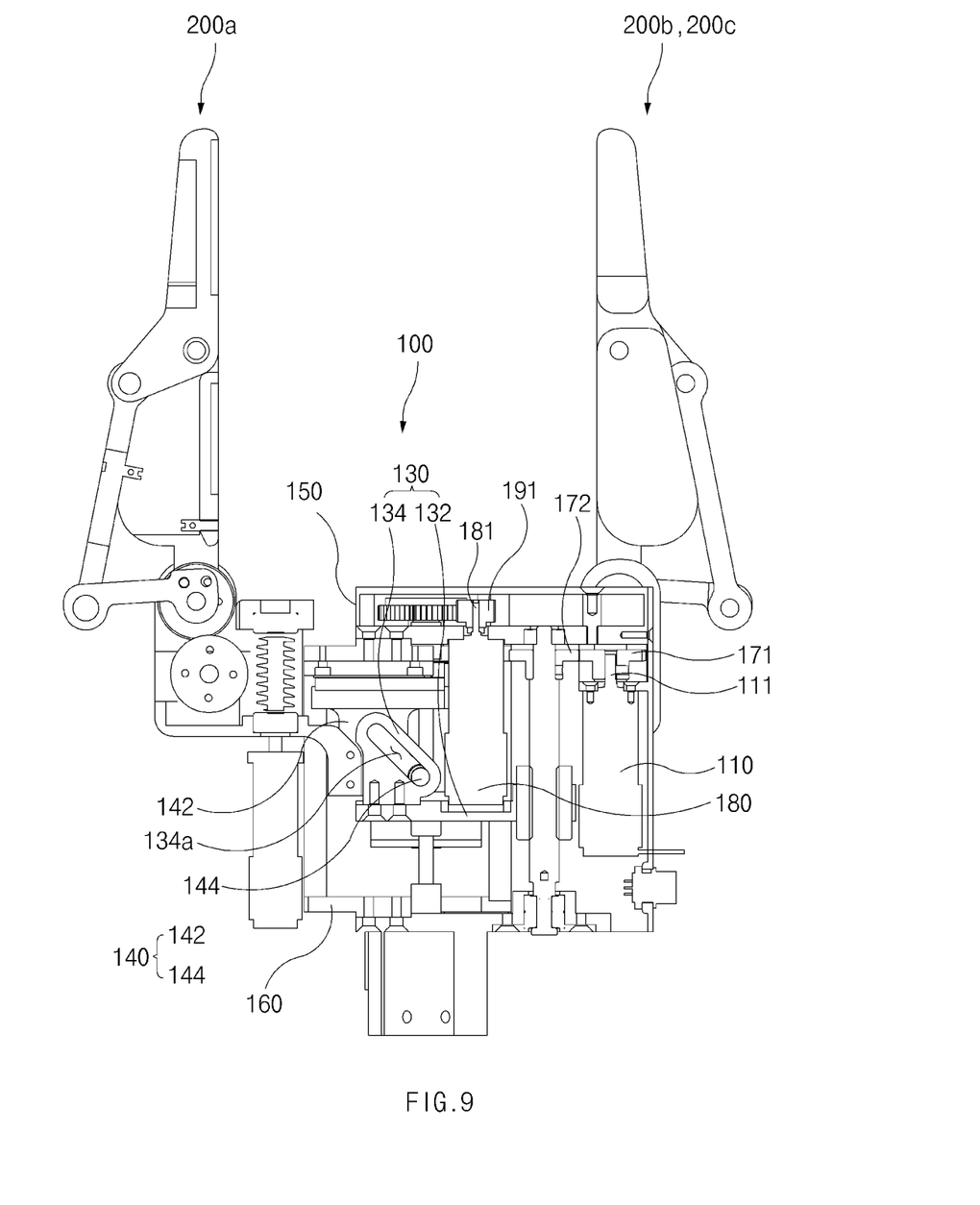
FIG. 9 is a vertical cross-sectional view illustrating a state in which the finger modules are positioned adjacent to the palm module of the gripper according to embodiments of the present disclosure.
Figure 10:
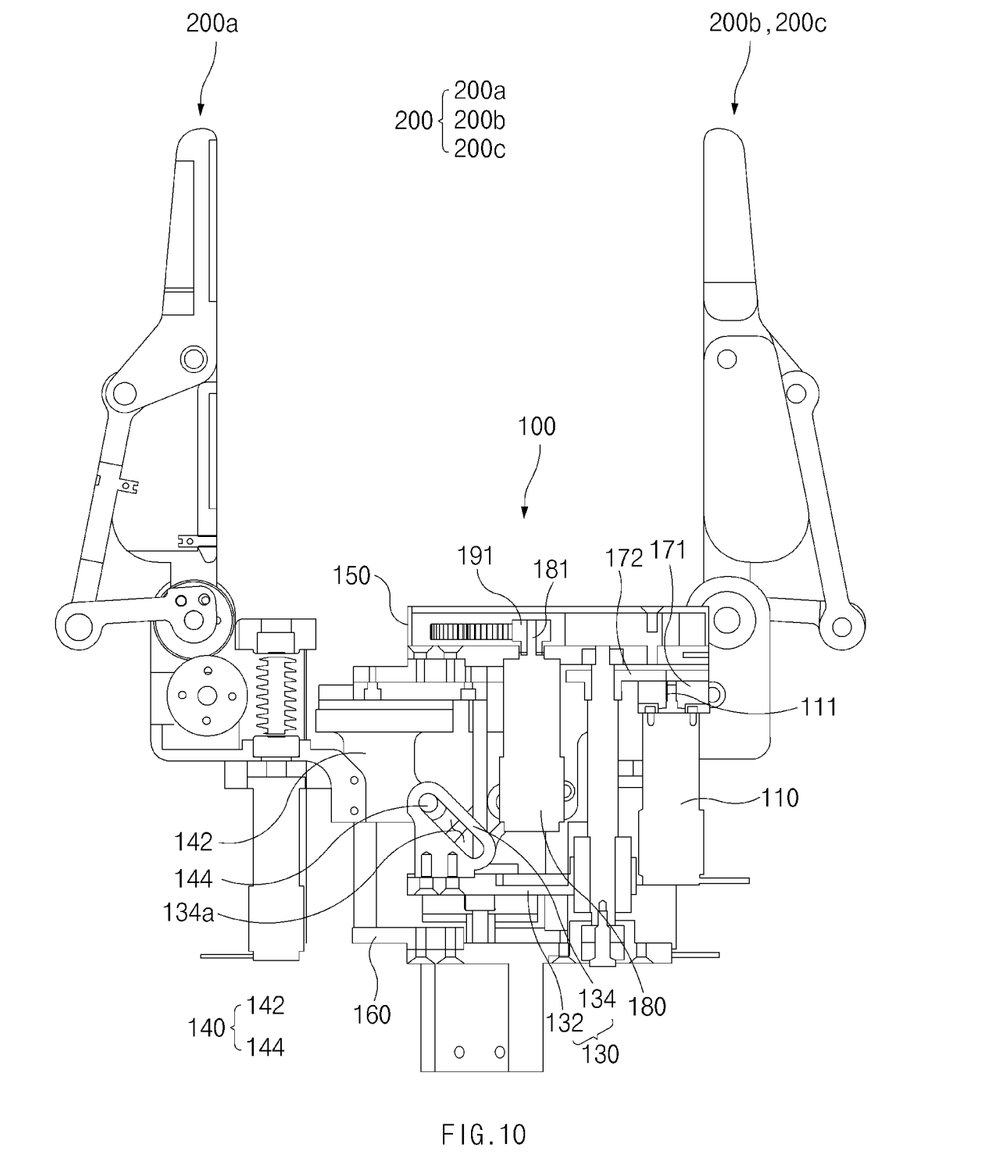
FIG. 10 is a vertical cross-sectional view illustrating a state in which the finger modules are spaced apart from the palm module of the gripper according to embodiments of the present disclosure.

FIG. 9 is a vertical cross-sectional view illustrating a state in which the finger modules are positioned adjacent to the palm module of the gripper according to embodiments of the present disclosure, and FIG. 10 is a vertical cross-sectional view illustrating a state in which the finger modules are spaced apart from the palm module of the gripper according to embodiments of the present disclosure.

As illustrated in FIG. 9, when the horizontal extension region 144 is positioned at a lower end of the groove 134a, the palm module 100 and the finger module 200 are positioned to be closest to each other. Thereafter, when the first member 130, i.e., the slide region 134, is moved downward by the operation of the first power unit 110, the connection member 140 is moved outward in the horizontal direction by the interference between the horizontal extension region 144 and the inner surface of the groove 134a, as illustrated in FIG. 10. That is, since the connection member 140 is restricted so as to move only in the horizontal direction, a vertical height of the connection member 140 is constant regardless of the vertical movement of the first member 130. When the first member 130 moves downward under this condition, the connection member 140 inevitably moves outward in the horizontal direction so that a vertical height of the horizontal extension region 144 inserted into the groove 134a, which moves downward, is kept constant. Therefore, the horizontally outward movement of the connection member 140 is implemented.

On the contrary, as illustrated in FIG. 10, when the horizontal extension region 144 is positioned at an upper end of the groove 134a, the palm module 100 and the finger module 200 are positioned to be closest to each other. Thereafter, when the first member 130, i.e., the slide region 134, is moved upward by the operation of the first power unit 110, the connection member 140 is moved inward in the horizontal direction by the interference between the horizontal extension region 144 and the inner surface of the groove 134a, as illustrated in FIG. 9.

Therefore, according to embodiments of the present disclosure described above, the horizontal distance between the palm module and the finger module 200 may be adjusted to conform to the type and size of the object to be grasped, which makes it possible for the gripper to grasp objects of various types and sizes.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A gripper comprising:
a palm module; and
a finger module coupled to one side of the palm module, wherein the palm module comprises:
    a first power unit comprising a first rotary shaft, the first power unit configured to rotate the first rotary shaft;
    a screw member configured to rotate in conjunction with a rotation of the first rotary shaft;
    a nut member coupled to the screw member by bolt-nut coupling;
    a first member fixedly coupled to the nut member and configured to be movable in a vertical direction in conjunction with a vertical motion of the nut member caused by a rotation of the screw member, the first member having a groove extending in one direction and having a recessed shape; and
    a connection member having a first side coupled to the finger module and a second side inserted into the groove, wherein the connection member is configured to be moved away from or toward the screw member by restriction between the connection member and an inner surface of the groove when the first member moves in the vertical direction.

2. The gripper of claim 1, wherein the first member comprises:
a plate region fixedly coupled to the nut member and having a plate shape extending in a horizontal direction; and
a slide region fixedly coupled to one side of the plate region and having the groove.

3. The gripper of claim 2, wherein the groove comprises a hole that penetrates the slide region.

4. The gripper of claim 2, wherein the groove has a shape extending in a direction inclined with respect to the vertical direction and the horizontal direction.

5. The gripper of claim 4, wherein the groove has a shape that extends upward as the shape extends outward in the horizontal direction.

6. The gripper of claim 1, wherein the palm module further comprises:
a second member spaced apart upward from the first member and coupled to an upper region of the screw member, wherein the upper region of the screw member is configured to be rotatable; and
a third member spaced apart downward from the first member and coupled to a lower region of the screw member, wherein the lower region of the screw member is configured to be rotatable.

7. The gripper of claim 1, wherein the connection member comprises:
a connection body region fixedly coupled to the finger module; and
a horizontal extension region extending in a horizontal direction from the connection body region and inserted into the groove.

8. The gripper of claim 1, wherein the palm module comprises:
a first-first gear fixedly coupled to the first rotary shaft; and
a first-second gear configured to engage with the first-first gear and fixedly coupled to the screw member.

9. The gripper of claim 8, wherein the first-first gear is disposed outward from the first-second gear.

10. The gripper of claim 1, wherein the finger module is provided in plural, the plurality of finger modules comprises a first finger module, a second finger module, and a third finger module that are separately provided, and the second and third finger modules are rotatable about the palm module.

11. The gripper of claim 10, wherein the first finger module is not rotatable about the palm module.

12. The gripper of claim 10, wherein a rotational motion of the second finger module relative to the palm module and a rotational motion of the third finger module relative to the palm module interact with each other.

13. The gripper of claim 12, wherein a direction of the rotational motion of the second finger module relative to the palm module is opposite to a direction of the rotational motion of the third finger module relative to the palm module.

14. A gripper comprising:
a palm module;
a plurality of finger modules coupled to one side of the palm module, the plurality of finger modules comprising a first finger module, a second finger module, and a third finger module that are separately provided, wherein the second and third finger modules are rotatable about the palm module and wherein the palm module comprises:
  a first power unit comprising a first rotary shaft, the first power unit configured to rotate the first rotary shaft;
  a screw member configured to rotate in conjunction with a rotation of the first rotary shaft;
  a nut member coupled to the screw member by bolt-nut coupling;
  a first member fixedly coupled to the nut member and configured to be movable in a vertical direction in conjunction with a vertical motion of the nut member caused by a rotation of the screw member, the first member having a groove extending in one direction and having a recessed shape;
  a connection member having a first side coupled to the finger module and a second side inserted into the groove, wherein the connection member is configured to be moved away from or toward the screw member by restriction between the connection member and an inner surface of the groove when the first member moves in the vertical direction;
  a second power unit comprising a second rotary shaft, the second power unit being configured to rotate the second rotary shaft;
  a second-first gear fixedly coupled to the second rotary shaft;
  a second-second gear configured to engage with the second-first gear; and
  a second-third gear configured to engage with the second-second gear and rotate the second finger module.

15. The gripper of claim 14, wherein the palm module further comprises:
  a second-fourth gear configured to engage with the second-second gear; and
  a second-fifth gear configured to engage with the second-fourth gear and rotate the third finger module.

16. The gripper of claim 15, wherein the second-second gear, the second-third gear, the second-fourth gear, and the second-fifth gear are disposed in a horizontal direction.

17. The gripper of claim 16, wherein the direction in which the second-second gear, the second-third gear, the second-fourth gear, and the second-fifth gear are disposed in the horizontal direction is perpendicular to a direction in which the first finger module extends in the horizontal direction from the palm module.

18. The gripper of claim 15, wherein an outer diameter of the second-second gear, an outer diameter of the second-third gear, an outer diameter of the second-fourth gear, and an outer diameter of the second-fifth gear are equal to one another.

19. The gripper of claim 18, wherein an outer diameter of the second-first gear is smaller than the outer diameter of each of the second-second gear, the second-third gear, the second-fourth gear, and the second-fifth gear.

20. A gripper comprising:
a palm module; and
a finger module coupled to one side of the palm module;
wherein the palm module comprises:
  a first power unit comprising a first rotary shaft, the first power unit configured to rotate the first rotary shaft;
  a screw member configured to rotate in conjunction with a rotation of the first rotary shaft;
  a nut member coupled to the screw member by bolt-nut coupling;
  a first member fixedly coupled to the nut member and configured to be movable in a vertical direction in conjunction with a vertical motion of the nut member caused by a rotation of the screw member, the first member having a groove extending in one direction and having a recessed shape; and
  a connection member having a first side coupled to the finger module and a second side inserted into the groove, wherein the connection member is configured to be moved away from or toward the screw member by restriction between the connection member and an inner surface of the groove when the first member moves in the vertical direction; and
wherein the finger module comprises:
  a second power unit comprising a second rotary shaft, the second power unit configured to rotate the second rotary shaft;
  a worm gear fixedly coupled to the second rotary shaft;
  a first gear configured to engage with the worm gear; and
  a second gear configured to rotate in conjunction with a rotation of the first gear.

* * * * *